US010495204B2

United States Patent
Dziuba et al.

(10) Patent No.: US 10,495,204 B2
(45) Date of Patent: Dec. 3, 2019

(54) POWER SPLIT GEARBOX FOR A MOTOR VEHICLE

(71) Applicant: NAF NEUNKIRCHENER ACHSENFABRIK AG, Neunkirchen (DE)

(72) Inventors: Peter Dziuba, Frickingen (DE); Josef Haglsperger, Gangkofen (DE); Josef Bauer, Nandlstadt (DE); Bernhard Schnabel, Starnberg (DE)

(73) Assignee: Naf Neunkirchener Achsenfabrik AG, Neunkirchen (DE)

( * ) Notice: Subject to any disclaimer, the term of this patent is extended or adjusted under 35 U.S.C. 154(b) by 0 days.

(21) Appl. No.: 15/538,711

(22) PCT Filed: Dec. 22, 2015

(86) PCT No.: PCT/EP2015/080985
§ 371 (c)(1),
(2) Date: Jun. 22, 2017

(87) PCT Pub. No.: WO2016/102572
PCT Pub. Date: Jun. 30, 2016

(65) Prior Publication Data
US 2018/0003280 A1 Jan. 4, 2018

(30) Foreign Application Priority Data
Dec. 23, 2014 (EP) .................................... 14200203

(51) Int. Cl.
*F16H 47/04* (2006.01)
*F16H 3/72* (2006.01)
(Continued)

(52) U.S. Cl.
CPC ............. *F16H 47/04* (2013.01); *F16H 3/728* (2013.01); *F16H 2037/0873* (2013.01); *F16H 2037/103* (2013.01); *F16H 2047/045* (2013.01)

(58) Field of Classification Search
CPC ................... F16H 47/047; F16H 3/728; F16H 2037/0873; F16H 2047/045
(Continued)

(56) References Cited

U.S. PATENT DOCUMENTS 4,843,907 A * 7/1989 Hagin .................... B60K 17/06
475/80
7,892,130 B1 2/2011 Gollner et al.
(Continued)

FOREIGN PATENT DOCUMENTS

DE 3817292 A1 10/1989
EP 2253867 A1 11/2010
(Continued)

OTHER PUBLICATIONS

English translation of EP2461073A1; http://translationportal.epo.org; Jan. 8, 2019 (Year: 2019).*

*Primary Examiner* — Roger L Pang
(74) *Attorney, Agent, or Firm* — Potomac Law Group, PLLC

(57) ABSTRACT

The invention relates to a power split gearbox for a motor vehicle. The power split gearbox comprises a drive shaft which can be connected to an internal combustion engine in order to feed in torque, a first mechanical branch with a planetary gear mechanism arrangement, an infinitely variable second branch which can be connected to the first branch and comprises two adjustable energy converters which can be coupled to one another in energy terms and can be operated in each case in both directions, and at least one output shaft which can be coupled to the drive shaft via the first and the second branch. At least one first reversing stage (Continued)

Figure 1:
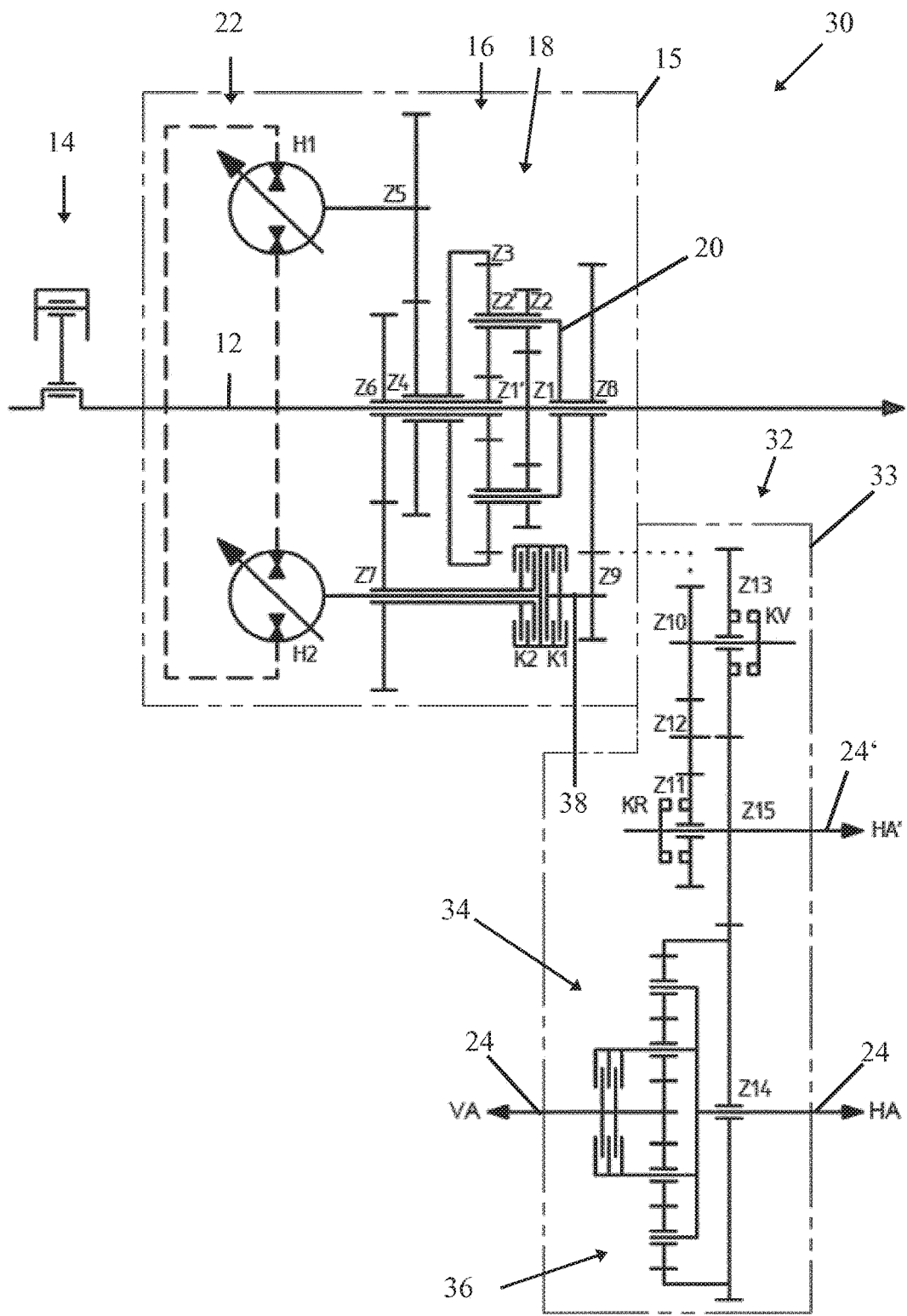

is provided between the drive shaft and the output shaft for changing between at least one first forward driving range and at least one first reverse driving range, wherein the reversing stage either reverses or keeps constant all of the rotational directions of the sun gears, the internal gear and the spider shaft during changing between the first forward driving range and the first reverse driving range.

11 Claims, 4 Drawing Sheets

(51) Int. Cl.
*F16H 37/08* (2006.01)
*F16H 37/10* (2006.01)

(58) Field of Classification Search
USPC .......................................... 475/72, 73, 80, 83
See application file for complete search history.

(56) References Cited

U.S. PATENT DOCUMENTS

| | | | |
|---|---|---|---|
| 9,097,342 B2* | 8/2015 | Dix | ............ F16H 61/472 |
| 9,975,424 B2* | 5/2018 | Krapf | ............ B60K 17/28 |
| 2006/0003861 A1* | 1/2006 | Weeramantry | ......... F16H 47/04 |
| | | | 475/72 |
| 2014/0218986 A1 | 8/2014 | Hasler et al. | |
| 2014/0248986 A1 | 9/2014 | Weeramantry et al. | |

FOREIGN PATENT DOCUMENTS

| | | | | |
|---|---|---|---|---|
| EP | 2280192 A1 | 2/2011 | | |
| EP | 2461073 A1 | 11/2011 | | |
| WO | WO-2012004173 A3 * | 12/2012 | ............ F16H 47/04 | |

\* cited by examiner

POWER SPLIT GEARBOX FOR A MOTOR VEHICLE

The invention relates to a power split gearbox for a motor vehicle, in particular for a self-propelled work machine.

Power split gearboxes serve for power transmission via a purely mechanical and a hydrostatic or electrical branch. Thereby, they are in particular suited for motor vehicles such as self-propelled work machines, wheel loaders or the like, which have to be able to start with high load on the one hand, but also are to have a sufficient minimum speed for advancement on public roads on the other hand. Thereto, a generic power split gearbox includes a drive shaft, which is connected to an internal combustion engine for inputting torque. Furthermore, the power split gearbox includes a mechanical first branch including a planetary gear mechanism arrangement with two sun gears of different diameter, an internal ring gear and a spider shaft, on which dual planetary gears are disposed, which mesh with the sun gears and with the internal gear. At least one of the sun gears is coupled to the drive shaft. Furthermore, such a power split gearbox includes an infinitely variable second branch, which is at least partially connectable to the first branch via the planetary gear mechanism arrangement and includes two, three or more adjustable hydraulic and/or electrical rotational energy converters, which can be energetically coupled to each other and each are operable in both directions either as a motor or as a pump in case of a hydraulic motor and as a generator in case of an electric motor, respectively. Finally, such a power split gearbox includes an output shaft, to which the first branch and the second branch are coupled. Usually, such power split gearboxes, as they are for example described in DE 2904572 A1, provide at least one forward driving range and one reverse driving range as well as a drive-through to a power take-off gear.

In the known power split gearbox, its behavior in reversing is disadvantageous. The initial situation is standstill of the motor vehicle. For reversing in a first reverse driving range, now, one of the pumps is swiveled out in opposite direction to forward drive. Hereby, the other hydrostat also rotates rearwards and superimposes its now reverse rotational motion at the output of the planetary gear mechanism arrangement. Now, the vehicle drives rearward, but the planetary gear mechanism arrangement is still driven in "forward direction" by the internal combustion engine. Thereby, a part of the power does not flow to the output, but is kept in the locked planetary gear mechanism arrangement as idle power. The faster the motor vehicle reverses, the greater this idle power portion becomes such that reversing in a reverse driving range corresponding to the second forward driving range is usually not possible. This idle power portion even exceeds the input power in fast reversing and thus reduces the lifetime of the energy converters as well as of the concerned gears and bearing locations. In addition, a motor vehicle equipped with such a power split gearbox rearwards reaches maximally ca. ⅓ of the forward maximum speed because it can only be driven in a first reverse driving range corresponding to the first forward driving range, but not in a second reverse driving range corresponding to a second forward driving range. The increasing power losses in reversing additionally result in an increasingly lowering traction, which can result in problems in reversing motor vehicles. Examples are entering a silage in tractors as well as an insufficient traction in reversing construction and forestry machines. In applications with frequent reversing, the idle power portion additionally becomes negatively noticeable by increased fuel consumption. For example, this is accepted in tractors, but such a restriction is often not acceptable in movable work machines such as for example wheel loaders and forestry machines.

It is the object of the present invention to provide a power split gearbox, which provides at least one reverse driving range without idle power.

According to the invention, the object is solved by a power split gearbox having the features of claim 1. Advantageous configurations with convenient developments of the power split gearbox are specified in the dependent claims.

A power split gearbox according to the invention, which can be moved rearwards without idle power, includes at least one first reversing stage between the drive shaft and the output shaft for changing between at least one first forward driving range and at least one first reverse driving range, wherein the reversing stage either reverses or keeps constant all of the rotational directions of the sun gears, the internal gear and the spider shaft upon changing between the first forward driving range and the first reverse driving range. In other words, a mechanical reversing stage is provided, which keeps the relative rotational directions of the sun gears, of the internal gear and the spider shaft in the same direction to each other upon change between forward driving range and reverse driving range such that individual components of the planetary gear mechanism arrangement are not reversed, while other components are not reversed. Hereby, it is reliably excluded that undesired rotational direction superpositions occur in the planetary gear mechanism arrangement upon change between forward and reverse drive such that the power split gearbox according to the invention can be selectively moved at least in a first forward driving range as well as in a first reverse driving range without idle power losses. Therein, it is basically sufficient if the power split gearbox according to the invention is connectable to only one internal combustion engine and only two energy converters of a motor vehicle, which can be formed as a hydraulic motor or as an electric motor independently of each other and accordingly can function as a motor or pump or rather generator, respectively. Furthermore, it can be provided that the first energy converter can be coupled to the internal gear of the planetary gear mechanism arrangement and/or that the second energy converter can be coupled to the second sun gear of the planetary gear mechanism arrangement. The power split gearbox according to the invention is in particular suitable for motor vehicles such as self-propelled work machines.

In an advantageous configuration of the invention, the first reversing stage is disposed at the output of the planetary gear mechanism arrangement and in particular coupled to the spider shaft of the planetary gear mechanism arrangement. This has the advantage that the power split gearbox functions rearward just as forward since only the rotational direction of the entire power split gearbox is reversed at the output by the first reversing stage such that a rotational direction reversal does not at all occur in the individual components of the planetary gear mechanism arrangement. Thereby, the first reversing stage can be added as an optional additional function in simple manner even in already existing power split gearboxes.

In a further advantageous configuration of the invention, it is provided that at least one first clutch element and one second clutch element are provided between an output side of the planetary gear mechanism arrangement and the output shaft, wherein torque is to be transmitted via the first clutch element in the first forward driving range and torque is to be transmitted via the second clutch element in the first reverse driving range. Hereby, the torque provided from the motor and the energy converters, respectively, can be conducted to the output shaft either via the first clutch element or via the second clutch element without idle power by shifting the clutch elements depending on direction of travel. The clutch elements can be formed for example as a dog clutch, multi-disk clutch or the like independently of each other.

Further advantages arise in that the first reversing stage includes a first gear paring with an even number of paired gears and a second gear pairing with an odd number of paired gears and is formed to transmit torque either via the first or via the second gear pairing from the planetary gear mechanism arrangement to the output shaft upon change between forward driving range and reverse driving range. This represents a constructively particularly simple, compact and inexpensive possibility of realizing a change between forward and reverse driving range without idle power.

In a further advantageous configuration of the invention, the first reversing stage is formed as a pre-mountable module assembly. Hereby, the first reversing stage can be pre-fabricated as a partial component of the power split gearbox and for example be provided as an additional option or retrofit solution for the power split gearbox, which thus can at least largely remain constructively unchanged. This has the advantage that differently formed power split gearboxes can be fast and simply provided with a respectively optimally adapted reversing stage. Therein, the first reversing stage can be accommodated in an associated housing or partial housing. Similarly, either exchange of the module assembly or of the remaining power split gearbox is sufficient in cases of damage, which for example correspondingly simplifies the repair of self-propelled work machines.

Furthermore, it can basically be provided that the first reversing stage includes the first and the second clutch element, by means of which either the first gear pairing or the second gear pairing can be coupled to the planetary gear mechanism arrangement for transmitting torque upon change between forward driving range and reverse driving range. Since the change between forward and reverse driving range occurs in the standstill of the motor vehicle, the clutch elements can be configured as inexpensive and compact dog clutches. However, other clutch types such as multi-disk clutches can alternatively be provided in this case too.

Further advantages arise in that a differential gear preferably lockable by means of a differential lock is provided between the first reversing stage and the at least one output shaft, by means of which a torque can be divided between a first output shaft and a second output shaft. Hereby, a functional extension of the power split gearbox is allowed by a differential gear functioning as an axle transfer gearbox, by means of which the torque can for example be distributed to a front and a rear axle of an associated vehicle. Preferably, the differential gear includes a differential lock to prevent the motor vehicle from being decelerated or even coming to a stop due to slip at one of the wheels by rigid coupling of front and rear axle.

In a further advantageous configuration of the invention, it is provided that the first energy converter and the second energy converter exchange their function upon change between the first forward driving range and a second forward driving range and/or that the first energy converter and the second energy converter maintain their function upon change between the first forward driving range and the first reverse driving range and/or that the first energy converter and the second energy converter are respectively similarly operated in the first forward driving range and in the first reverse driving range. Hereby, a particularly simple control of the power split gearbox is allowed since it does not have to be differentiated between forward and reverse drive with regard to the energy converters. Therein, the control can basically be manually or preferably automatically effected.

Further advantages are achieved if the first reversing stage is formed to reverse a rotational direction of the output of the planetary gear mechanism arrangement relative to a rotational direction of the second energy converter. This represents a constructively simple possibility of avoiding idle power losses since the rotational direction of the output of the planetary drive is reversed together with the rotational direction of the energy converter by means of the first reversing stage.

In a further advantageous configuration of the invention, it is provided that the second energy converter can be coupled to an output shaft and decoupled from the output shaft preferably by means of a clutch device. In other words, instead of a direct coupling of the second energy converter to the spider shaft of the planetary gear mechanism arrangement, coupling of the second energy converter to the output shaft is provided. Hereby, the mechanical branch can be reversed before it is again coupled to the hydrostatic power branch via the second hydrostat. This offers the advantage that the sum of the torques of all of the drive motors does not have to be reversed at a location in the power split gearbox, but that the mechanical and the hydrostatic or electrical branch can be reversed independently of each other and again be combined only after reversing. Hereby, the power split gearbox can be correspondingly more compactly formed. Therein, at least one clutch device can basically be provided, by means of which the second energy converter can be coupled to the output shaft or decoupled from the output shaft. Hereby, a simple possibility of selective decoupling of the torque of the second energy converter is given, for example upon change between different traveling ranges.

In a further advantageous configuration of the invention, a second reversing stage for changing between the first reverse driving range and a second reverse driving range is provided. Hereby, a second reverse driving range can be provided, whereby the vehicle can be selectively moved forward or rearward at the same speed and without additionally occurring idle power.

Further advantages arise in that the second reversing stage is formed to reverse a rotational direction of the second sun gear relative to the rotational direction of the second hydrostat. This allows simple adaptation of the rotational directions of the first and the second hydrostat upon passing the second reverse driving range.

In further configuration of the invention, a particularly installation space saving arrangement is achieved in that the second reversing stage is disposed between the second energy converter and the planetary gear mechanism arrangement.

Furthermore, it has proven advantageous if the first reversing stage is associated with the first branch and the second reversing stage is associated with the second branch. This allows particularly flexible and mutually separated reversal of the mechanical and the hydraulic or electrical branch of the power split gearbox.

Further advantages arise if the first energy converter and the second energy converter exchange their function upon change between the first reverse driving range and the second reverse driving range and/or if the first energy converter is inversely swiveled out in the second reverse driving range to the second forward driving range. This represents a constructively simple possibility of changing between the first and second reverse driving range.

A further advantageous possibility of installation space saving configuration of the power split gearbox is achieved in that at least two clutch elements are combined in a common assembly. By this modular construction, the assembly and disassembly of the at least two clutches are additionally facilitated. Furthermore, different clutch combinations can be provided pre-fabricated and installed depending on the configuration and the respective purpose of employment of the power split gearbox.

Figure 2:
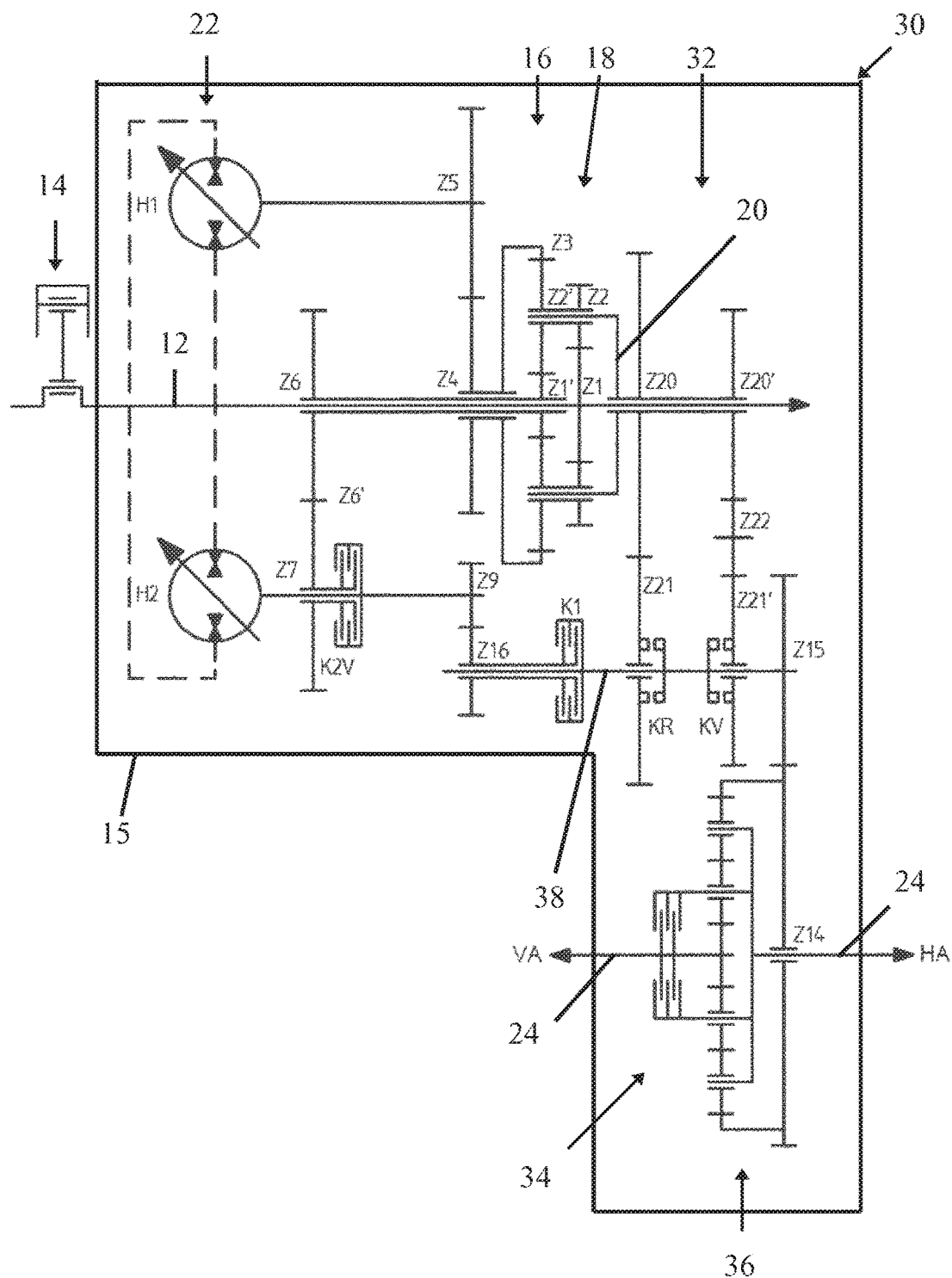
Figure 3:
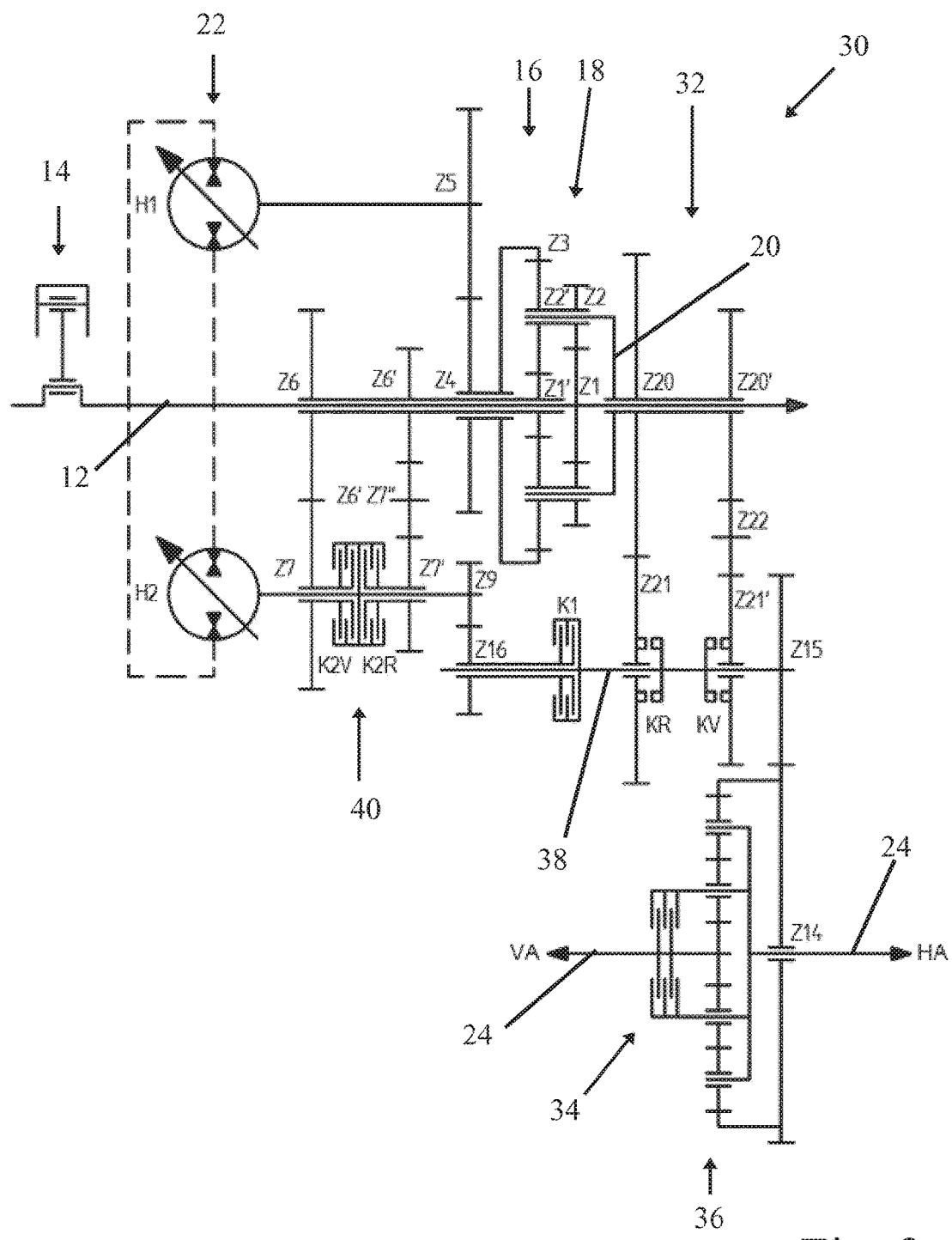
Figure 4:
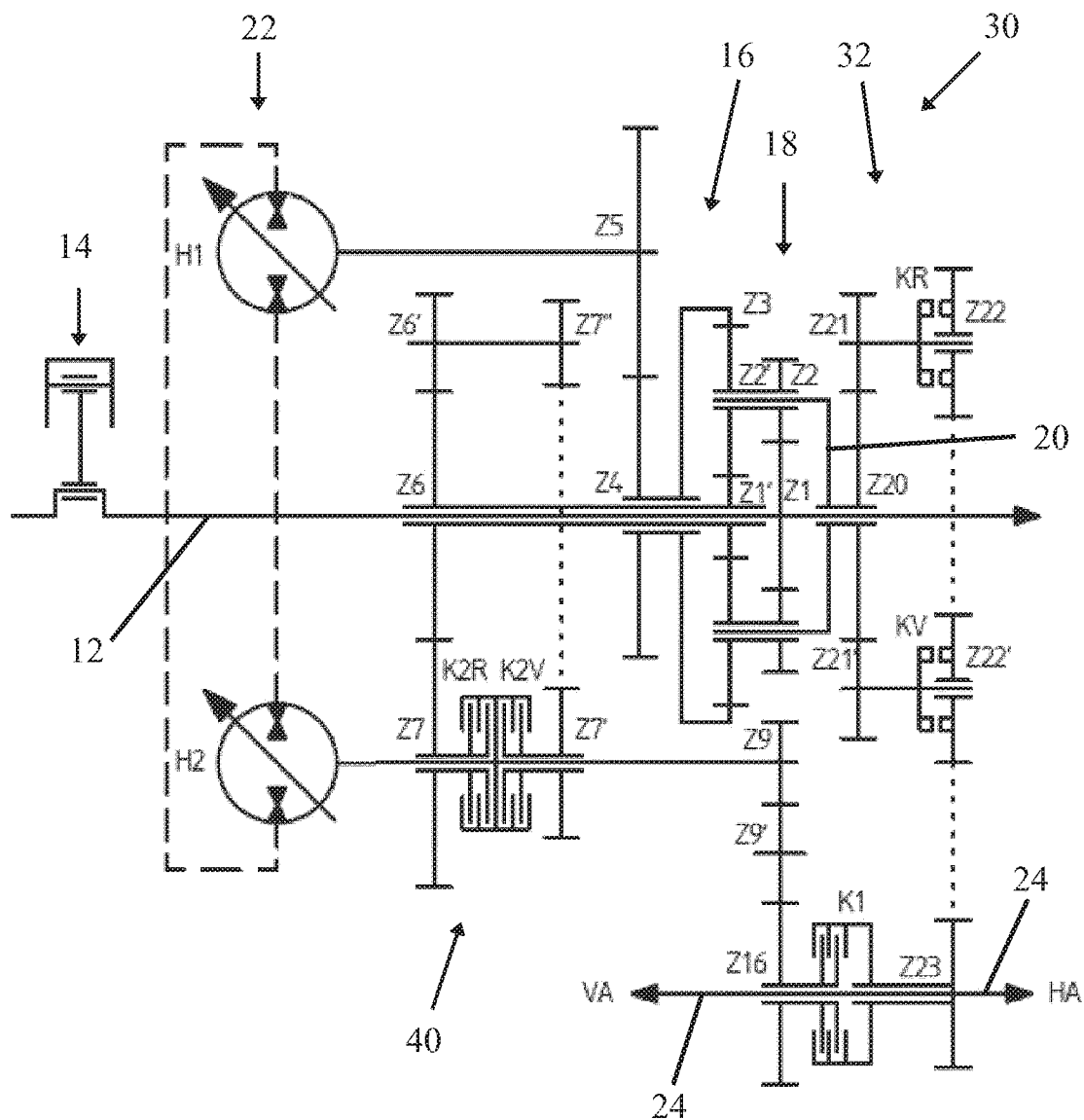

Further features of the invention are apparent from the claims, the embodiments as well as based on the drawings. The features and feature combinations mentioned above in the description as well as the features and feature combinations mentioned below in the embodiments are usable not only in the respectively specified combination, but also in other combinations without departing from the scope of the invention. There shows:

FIG. 1 a schematic diagram of a first embodiment of a power split gearbox according to the invention;

FIG. 2 a schematic diagram of a second embodiment of the power split gearbox according to the invention;

FIG. 3 a schematic diagram of a third embodiment of the power split gearbox according to the invention; and FIG. 4 a schematic diagram of a fourth embodiment of the power split gearbox according to the invention.

FIG. 1 shows a schematic diagram of a first embodiment of a power split gearbox 30 according to the invention, which can for example be installed in motor vehicles such as self-propelled work machines, wheel loaders or the like. The power split gearbox 30 includes a drive shaft 12, which is connected to an internal combustion engine 14 of the motor vehicle (not shown) for inputting torque and is passed completely through a housing 15 for a basically optional drive-through. Furthermore, the power split gearbox 30 includes a mechanical first branch 16, which includes a planetary gear mechanism arrangement 18 with at least two sun gears Z1, Z1' of different diameter, an internal gear Z3 and a spider shaft 20, on which dual planetary gears Z2, Z2' are disposed, which mesh with the sun gears Z1, Z1' and with the internal gear Z3, wherein at least the sun gear Z1 is coupled to the drive shaft 12. Furthermore, the power split gearbox 30 includes a hydraulic second branch 22, which is at least partially connectable to the mechanical branch 16 via the planetary gear mechanism arrangement 18 and includes two energy converters H1, H2 presently formed as adjustable hydrostats, which can be energetically coupled to each other and each can be operated in both directions as a motor or pump. The energy converters H1, H2 can also be formed as an electric motor independently of each other, which is operable either as a motor or as a generator. Alternatively or additionally, pneumatic energy converters can also be provided. However, in simplest configuration, the motor vehicle equipped with the power split gearbox 30 includes only an internal combustion engine 14 and only two energy converters H1, H2.

Further, the power split gearbox 30 includes an output shaft 24, to which the first branch 16 and the second branch 22 can be coupled by means of the gear stage Z8/Z9. In the power split gearbox 30 according to the invention, the output gear Z8 is engaged with or at least coupled to the gear Z10 of a first reversing stage 32 at the spider shaft 20 of the planetary gear mechanism arrangement 18. The first reversing stage 32 in turn is formed as a pre-mountable module assembly and accommodated in a separate housing 33, which is connected to the housing 15.

For a first forward driving range, a first clutch device KV is closed and a second clutch device KR is opened in the first reversing stage 32. Thereby, a first output shaft 24' rotates at the gear Z15 in the same direction with the gear Z8 of the planetary gear mechanism arrangement 18. The odd gear pairing Z10/Z12/Z11 idles and does not transmit power.

For a first reverse driving range, the clutch device KV is opened, while the clutch device KR is closed. The output shaft 24' now rotates at the gear Z15 in opposite direction with the gear Z8 of the planetary gear mechanism arrangement 18. The even gear paring Z13/Z15 idles and does not transmit power.

The functions of the hydrostats H1 and H2 as well as of the clutch devices K1 and K2 remain unaffected in this assembly such that the power split gearbox 30 functions rearward as well as forward without of idle power since the rotational direction of the gearbox part accommodated in the housing 15 is completely reversed at the output by means of the first reversing stage 32. In other words, the superimposed torques of the mechanical branch 16 and the hydrostatic branch 22 are combined before the reversing stage 32 and subsequently commonly reversed. Thereby, the shown power split gearbox 30 provides two forward gears and two corresponding reverse gears, which can be passed without idle power.

Since forward/rearward shifting occurs in the standstill, the clutch devices KV/KR can additionally advantageously be configured as dog clutches. However, other forms of clutches such as multi-disk clutches are also conceivable. The output via the output shaft 24' to the rear axle HA' is especially advantageous for vehicles, which require a comparatively short pitch between input and output.

Alternatively or additionally, an extension of the power split gearbox 30 with a differential gear 34 formed as an axle transfer case can also be provided. Starting from the gear Z14, the torque can be distributed to a front axle VA and a rear axle HA via a preferably lockable planetary gear 36 with the aid of the differential gear 34. Such an assembly is especially advantageous for vehicles, which require a longer pitch from input to output such as wheel loaders.

FIG. 2 shows a schematic diagram of a second embodiment of the power split gearbox 30 according to the invention, in which the first reversing stage 32 is formed to reverse the rotational direction of the spider shaft 20 of the planetary gear mechanism arrangement 18 (PLG) relative to the rotational direction of the second hydrostat H2. In contrast to the embodiment according to FIG. 1, the second hydrostat or energy converter H2 is again coupled to the mechanical branch 16 only after the reversing stage 32. In other words, the superimposed torques of the mechanical branch 16 and the hydrostatic branch 22 are not commonly reversed, but the reversing stage 32 only reverses the mechanical branch 16. Hereby, a lower torque acts on the reversing stage 32, whereby the power split gearbox 30 can be more compactly, lighter and more inexpensively formed. By the first reversing stage 32, the output at the spider shaft 20 of the PLG 18 is divided into two gears Z20 and Z20' and connected to the output shaft 24 in opposite or same direction with the gear Z15 via the gears Z21 and Z22-Z21', respectively. In this variant, the coupling of the hydrostat H2 to the output is not directly effected to the spider shaft 20 of the PLG 18, but instead via the clutch device K1 to an output shaft 38, where the optionally reversed mechanical branch 16 can again be coupled to the hydrostatic branch 22 via the clutch devices KV and KR, respectively. Therein, it is to be emphasized that the clutch device K1 can also be disposed between the further clutch device K2V, which serves for providing a basically optional second forward gear, and the gear Z9.

In a first forward driving range, the hydrostat H1 functions as a pump, while the hydrostat H2 functions as a motor. The internal combustion engine 14 drives the PLG 18 via the sun gear Z1. The internal gear Z3 supports itself on the pump H1 via the gear pairing Z4/Z5. The spider 20 acts as an output via the reversing stage 32 (gear pairings Z20/Z21 and Z20'/Z21'). The clutch device K1 is closed, while the clutch device K2V is opened. The hydrostat H2 is now connected to the output of the mechanical reversing stage 32 via the gear pairing Z9/Z16. The gear pairing Z1'/Z6/Z7 presently including a gear chain idles and does not transmit power.

In forward drive, thus, the power split gearbox 30 shown in FIG. 2 and the embodiment described in FIG. 1 function in similar manner. For reverse drive in a first reverse driving range, the first clutch device KV is opened, while the clutch device KR is closed in standstill. If the clutch device KR is closed, the hydraulic motor H1 again functions as a pump, but is now swiveled out in opposite direction to the forward drive. Thereby, the hydrostat H2 acts as a motor on the output shaft 24 also in reverse rotational direction with the gear Z15. However, since the rotational direction of the PLG 18 has also been reversed by means of the reversing stage 32 (Z20/Z21), the rotational direction of the motor H2 now acts in the same rotational direction as the PLG 18. Thus, idle power does no longer arise. The power split gearbox 30 now drives rearward as well as forward in the first gear with the same power and functionality, wherein two forward gears and one reverse gear in total are available.

The arrangement of the reversing stage 32 at the spider 20 of the PLG 18 and the subsequent coupling of the hydrostat H2 are advantageous for multiple reasons. Since the clutches KV and KR only have to bear the mechanical portion of the torque from the PLG 18, but not additionally the high torque of the hydrostat H2, they can be configured considerably smaller and lighter. Upon shifting the clutch device KV and KR, the output of the power split gearbox 30 is further separated from the PLG 18 only for a short time. However, the vehicle does not start to move even on the slope because the torque is supported at the output via the hydrostat H1 in extended position. By the arrangement of the clutch device KV and KR between PLG 18 and energy converter H2, an "automatic" twist of the clutches KV/KR upon shifting finally results. As long as one of the clutches KV/KR is closed, the internal combustion engine 14 drives the hydraulic motor H1 functioning as a pump in extended position. The sun gear shaft Z1 of the planetary gear mechanism arrangement 18 supports itself at the standing vehicle. If both clutches KV/KR open upon shifting, the rotating movement at the pump H1 decelerates because the drag moment thereof decelerates the internal gear Z3 and the internal combustion engine 14 begins to accelerate the now open reversing stage 32. Thus, the power split gearbox 30 can be controlled such that the KR clutch is already pressurized upon shifting between forward and rearward drive before the KV clutch opens. The KR clutch then will not yet close in many cases because it is tooth to tooth. If the KV clutch then opens, the internal combustion engine 14 turns the dogs of the KR clutch to each other such that they slip into the next free tooth gap.

FIG. 3 shows a schematic diagram of a third embodiment of the power split gearbox 30 according to the invention, in which a first reversing stage 32 associated with the first branch 16 and a second reversing stage 40 associated with the second branch 22 are provided. In the first forward and reverse driving range, the power split gearbox 30 functions in this variant of implementation as it was described in context with the second embodiment. The same applies to the change from the first into the second forward driving range.

If the maximum speed of the first forward driving range is reached in corresponding reverse drive, the hydraulic motor H1 functioning as a pump is fully swiveled out in direction "rearward", while the hydraulic motor H2 is in extended position. As was already mentioned, it is sufficient for many applications that only the first forward driving range is fully reversible and thus can be operated without idle power as it was shown in the second embodiment.

However, if the motor vehicle is to be able to achieve the same speed forward as well as rearward, the power split gearbox 30 in this arrangement requires the second reversing stage 40. In order that the motor H2 can become a pump upon transition from the first driving range to the second driving range (V/R), it has to be swiveled out in opposite direction on its part as soon as the clutch device K1 is opened.

However, its rotational direction does no longer match that of the hydrostat H1 and thus has also to be reversed. This is achieved by the second reversing stage 40 with the gear pairing Z6'/Z7"/Z7'. Thus, the power split gearbox 30 is completely reversible without idle power also in the second driving range in that the pump H2, the motor H1 and the output rotate in reverse rotating direction via Z20/Z21. The clutches K2V, K2R are disposed between the gear pairings Z6/Z7 and Z6'/Z7"/Z7' as a part of the second reversing stage 40 and presently combined as a compact assembly. In the second forward gear, the clutch K2V is closed, while the clutch K2R is opened, in the second reverse gear, the clutch K2R is closed, while the other clutch K2V is opened.

It is to be emphasized that various constructive variants of the power split gearbox 30 can be provided within the scope of the invention. Thus, the clutch device K1 can for example alternatively also be disposed at the gear Z9. Alternatively or additionally, the clutch devices K2V/K2R of the second reversing stage 40 can also be disposed at the gear pairing Z6/Z6'. First of all, it should only be taken care that the hydrostat H2 can be made connectible to the second sun gear Z1' in opposite rotational directions and that the hydrostat H2 can be connected to the output 24 via the clutch device K1 after reversing the mechanical branch 16. Similarly, the spider output of the planetary gear mechanism arrangement 18 should be made connectible to the output 24 in opposite rotational directions.

FIG. 4 shows a schematic diagram of a fourth embodiment of the power split gearbox 30 according to the invention. The general functionality of the fourth embodiment basically corresponds to that of the third embodiment, wherein the fourth embodiment in particular has an even more compact construction of the reversing stage 32 and the further reversing stage 40 and does not have a separate differential gear 34. One recognizes that in particular the gear pairings Z7/Z6/Z6' and Z7'/Z7" of the second reversing stage 40 are differently arranged compared to the third embodiment. Furthermore, the clutch device K1 shown in the third embodiment was moved into the area of the output shaft 24 (VA/HA) and coupled to the second hydrostat H2 via an additional gear Z9', whereby a differing configuration of the second reversing stage 40 results. Furthermore, the first reversing stage 32 differs with regard to the dog clutches KR and KV in construction from the first reversing stage 32 described in context with the third embodiment. Thus, the spider shaft 20 is connected to the gear Z20, which in turn meshes with the gears Z21 and Z21'. They can be coupled to the gears Z22 and Z22', respectively, via the dog clutches KR and KV, respectively, and act on the clutch device K1 via the gear Z23, which is in operative connection to the second reversing stage 40 via the gear pairing Z16/Z9'/Z9 on the other hand.

The invention claimed is:

1. A power split gearbox for a motor vehicle comprising:
   at least one drive shaft, which is connectible to an internal combustion engine for inputting torque;
   a first branch, which includes a planetary gear mechanism arrangement with at least two sun gears, an internal gear and a spider shaft, on which dual planetary gears are disposed, which mesh with the sun gears and the internal gear, wherein at least one of the sun gears is coupled to the drive shaft;
   an infinitely variable second branch, which can at least partially be connected to the first branch via the planetary gear mechanism arrangement and includes at least a first and a second adjustable hydraulic and/or electrical rotational energy converter, which can be energetically coupled to each other and are each operable in both directions as a motor or as a pump or a generator, respectively;
   at least one output shaft, which can be coupled to the drive shaft via the first branch and the second branch;
   a first reversing stage for changing between at least one first forward driving range and at least one first reverse driving range is provided between the drive shaft and the output shaft, wherein the first reversing stage is adapted to reverse a rotational direction of the output of the planetary gear mechanism arrangement relative to a rotational direction of the second energy converter, wherein the second energy converter is coupled to the output shaft via a first clutch device; and
   a second reversing stage comprising a second clutch device and a third clutch device and disposed between the second energy converter and the output of the planetary gear mechanism arrangement.

2. The power split gearbox according to claim 1, wherein the first reversing stage is disposed at the output of the planetary gear mechanism arrangement and coupled to the spider shaft of the planetary gear mechanism arrangement.

3. The power split gearbox according to claim 1, wherein at least one first clutch element and one second clutch element are provided between an output side of the planetary gear mechanism arrangement and the output shaft, wherein torque is to be transmitted via the first clutch element in the first forward driving range and torque is to be transmitted via the second clutch element in the first reverse driving range.

4. The power split gearbox according to claim 1, wherein the first reversing stage includes a first gear pairing with an even number of paired gears and a second gear pairing with an odd number of paired gears and is formed to transmit torque from the planetary gear mechanism arrangement to the output shaft either via the first gear or via the second gear pairing upon changing between forward driving range and reverse driving range.

5. The power split gearbox according to claim 1, wherein the first reversing stage is formed as a pre-mountable module assembly.

6. The power split gearbox according to claim 1, wherein a differential gear lockable by means of a differential lock is provided between the first reversing stage and the at least one output shaft, by means of which a torque can be divided between a first output shaft and a second output shaft.

7. The power split gearbox according to claim 1, wherein the first energy converter and the second energy converter exchange their function upon change between the first forward driving range and a second forward driving range and/or that the first energy converter and the second energy converter maintain their function upon change between the first forward driving range and the first reverse driving range and/or that the first energy converter and the second energy converter are each similarly operated in the first forward drive range and in the first reverse driving range.

8. The power split gearbox according to 1, wherein the second reversing stage is provided for changing between a first reverse driving range and a second reverse driving range.

9. The power split gearbox according to claim 8, wherein the second reversing stage is formed to reverse a rotational direction of a second sun gear relative to the rotational direction of the second energy converter.

10. The power split gearbox according to claim 8, wherein the first energy converter and the second energy exchange their function upon change between the first reverse driving range and the second reverse driving range and/or that the first energy converter is reversely operated in the second reverse driving range to the second forward driving range.

11. The power split gearbox according to claim 1, wherein at least two clutch elements are combined in a common assembly.

* * * * *